United States Patent [19]
Espeel

[11] 3,818,940
[45] June 25, 1974

[54] PNEUMATIC CONTROL SYSTEM FOR AIR FILTER CLEANING APPARATUS
[75] Inventor: Frans Joris Espeel, Oberuzwil, Switzerland
[73] Assignee: Gebrueder Buehler AG, Uzwil, St. Gallen, Switzerland
[22] Filed: July 17, 1972
[21] Appl. No.: 272,194

[30] Foreign Application Priority Data
July 20, 1971 Switzerland.................... 10639/71

[52] U.S. Cl. ........................................ 137/624.14
[51] Int. Cl. ............................................. B01d 46/04
[58] Field of Search..... 137/624.13, 624.14, 624.18, 137/624.19

[56] References Cited
UNITED STATES PATENTS
3,729,903  5/1973  Espeel et al. ....................... 55/302

Primary Examiner—Henry T. Klinksiek
Attorney, Agent, or Firm—Merchant, Gould, Smith & Edell

[57] ABSTRACT

Control system for pneumatic control of a cleaning arrangement for dust filters wherein a plurality of tubular filter elements are cleaned by a blast of air forced through the filter elements successively and in the direction reverse to that of filtering air flow. A plurality of quick-opening valves are operatively connected to outlet ports in a housing defining a pressure chamber. An arm is movably mounted in the chamber and has an air passage therethrough from its inner end to its outer end, the outer end being movable over the outlet ports in succession. The arm is moved intermittently by pneumatically operated means including an actuator movable alternately in opposite directions. The inner end of the air passage communicates with a pneumatically operated control valve that is disposed in a pneumatic control circuit including other valve mechanisms operated responsive to movement of the actuator in opposite directions to open and close the pneumatically operated valve, to respectively permit a corresponding quick-opening valve to open, and to seal off the chamber from atmosphere during movement of the arm from one outlet port to the next succeeding outlet port.

12 Claims, 8 Drawing Figures

PNEUMATIC CONTROL SYSTEM FOR AIR FILTER CLEANING APPARATUS

The object of the present invention is a pneumatic dust removal plant with pneumatic clean air valves that are operated by a pneumatic-mechanical sequence control having at least one signal output or fluid outlet port operatively connected to a clean air valve or a group thereof for intake and exhaust ventilation.

Pneumatic dust removal plants with clean air valves are known. These clean air valves close or open the connecting duct running from the clean air container to the inside of the filter tubes. The filter tubes are cleaned by a reverse blast of clean air therethrough once in the course of periodically repeated cleaning cycles. The individual filter tubes or groups of tubes are cleaned in succession during a cleaning cycle. Hence, a sequence control for the consecutive activation is necessary. Electric, mechanical and pneumatic sequence controls are known. A disadvantage of the former is the need for an explosion shield, while the disadvantage of the latter two is their expensive construction and troublesome maintenance.

The present invention undertakes the task of making a pneumatic-mechanical sequence control which is structurally simple, compact in format, explosion-proof and maintenance-free.

According to the invention, the objectives are achieved as follows: The signal or outlet ports open through the wall of a housing, the inner wall surface of the housing engaging the radially outwardly projecting arm of a rotary shaft disposed in a pressure chamber defined by the housing. The arrangement is such that at any point the radial arm closes one of the output ports from the inside of the housing. The arm is provided with a passage that extends longitudinally from end to end thereof, the outer end of the passage moving into registration with the outlet ports in succession, the arm including a shaft portion that is journaled in the housing, the inner end portion of the passage extending axially through the end of the shaft portion remote from said arm. Pneumatically operated devices are provided to periodically close the inner end of the passage and to rotate the arm from one outlet port to the next successive one thereof. The chamber defined by the housing is supplied with compressed air from a suitable source thereof.

DETAILED DESCRIPTION OF THE PREFERRED EMBODIMENT OF FIGS. 1-3

Figure 1:
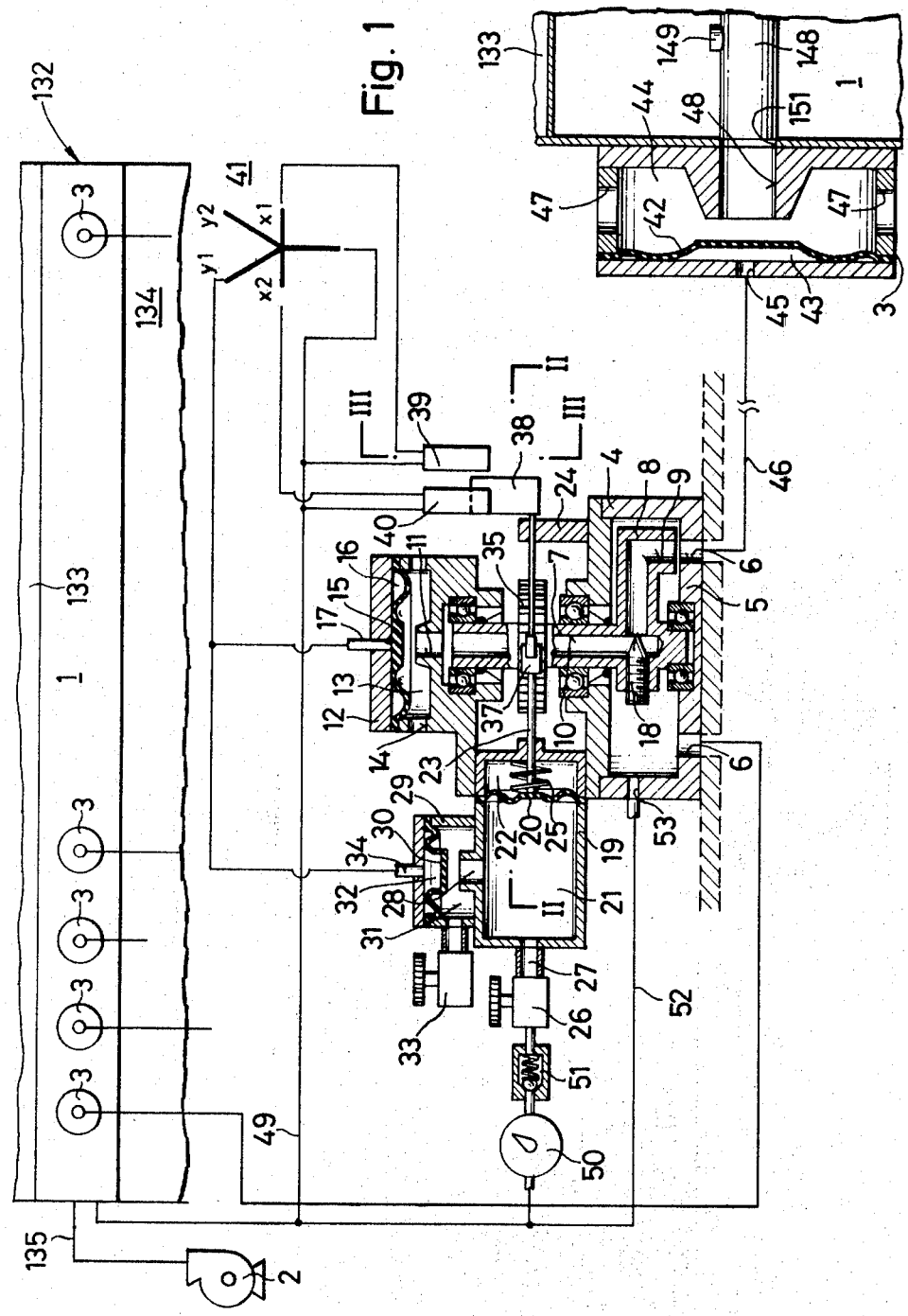
FIG. 1 is a view partly in section and partly diagrammatic, showing a preferred embodiment of the invention.

In FIG. 1, the reference numeral 1 indicates the clean air container of a pneumatic dust removal plant, the container 1 being supplied with air under pressure by a fan 2. To exhaust the clean air valves of the individual filter tubes, not shown, several clean air valves, not shown, may be assumed to be connected to one of a plurality of quick-opening valves 3, one of which is shown in FIG. 1.

A sequence control for opening the valves 3 in succession, comprises a generally cylindrical housing 4 having an end wall 5 which defines a plurality of circumferentially spaced axial air outlet ports on signal outputs 6 each of which is adapted to be connected to a different one of the quick-opening valves 3, such as by means of a conduit indicated diagrammatically at 46. A rotatable shaft 7 is journaled axially of the housing 4 and comprises the inner end portion of a radial arm 8 having an air passage 9 extending longitudinally therethrough. A continuation of the passage 9 is in the nature of an axial passage portion 10 that extends outwardly through the end of the shaft 7 remote from the radial arm 8. The passage portion 10 communicates with an exhaust chamber 13 through an opening 11 in a cylindrical housing 12 which defines the exhaust chamber 13. The exhaust chamber 13 communicates with outside atmosphere through ventilation holes 14. A diaphragm or membrane 15 seals the exhaust chamber 13 from a pressure chamber 16 defined by the housing 12, one wall of the housing 12 having a port 17 communicating with the pressure chamber 16. The arm 8 is provided with a metering valve 18 regulating the flow of air through the passage 9 and passage portion 10.

Firmly connected to the housings 4 and 12 is a cylindrical housing 19 the inside of which is divided by a diaphragm or membrane 20 into a pressure chamber 21 and a spring chamber 22. A rod or stem 23 has one end fixed to the membrane 20 and projects axially outwardly of the end of the housing 19 adjacent the spring chamber 22, the outer end portion of the stem 23 being slidably supported in a bearing 24. A coil compression spring 25 loosely encompasses the stem 23 within the spring chamber 22 yieldingly urges the membrane 20 and stem 23 in one direction of reciprocatory movement axially of the cylindrical housing 19. By means of a throttle valve 26 and a connecting branch pipe 27, compressed air can be metered into the pressure chamber 21 to move the membrane 20 and stem 23 axially of the housing 19 against yielding bias of the spring 25. The pressure chamber 21 can be evacuated by means of an exhaust branch pipe 28 which opens into an exhaust ventilation housing 29 the inside of which is divided by a diaphragm or membrane 30 into an exhaust chamber 31 and a pressure chamber 32. The exhaust chamber 21 is connected with outside atmosphere or any other low pressure source by a throttle valve 33 that is adapted to regulate the rate of exhaust ventilation from the pressure chamber 21 and exhaust chamber 31. The pressure chamber 32 is provided with a fluid port 34. If the pressure in the pressure chamber 32 is greater than in the exhaust chamber 31, the membrane 30 presses against the exhaust ventilation branch pipe 28 and seals off the pressure chamber 21.

Figure 2:
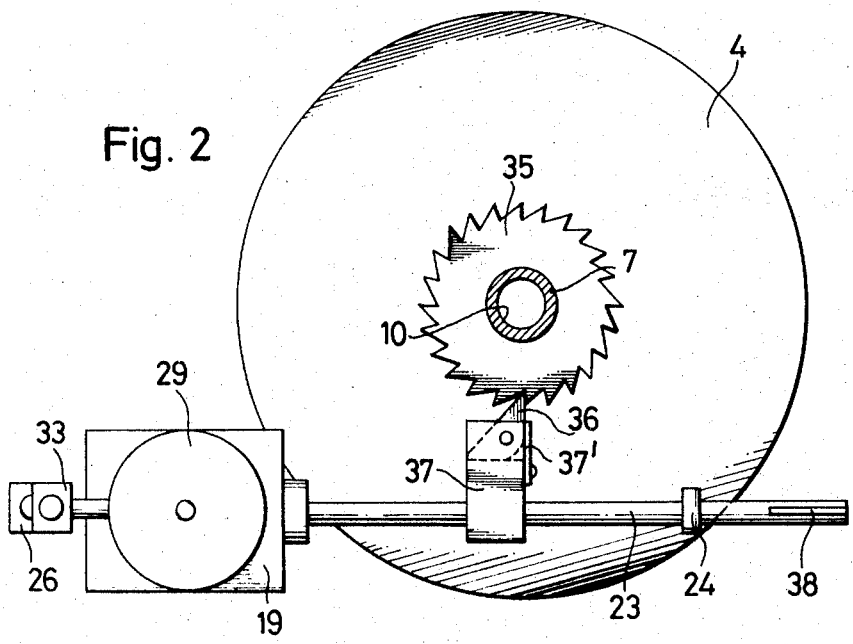
FIG. 2 is an enlarged view partly in top plan and partly in section, taken generally on the line II—II of FIG. 1.

A ratchet wheel 35 is rigidly secured on the shaft 7 for common rotation therewith, the ratchet wheel 35 cooperating with a pawl 36 that is swivel mounted in a bearing component 37 and fastened to the stem 23 and held in a normally operative position shown in FIG. 2 by a leaf spring 37'. The number of teeth on the ratchet wheel 35 corresponds to the number of signal outputs or outlet ports 6, so that with each movement of the stem 223 in a direction against bias of the spring 25, the pawl 36 turns the ratchet wheel 35 ahead one tooth, and the arm 8 is swung to the next successive signal output 6 in the cleaning cycle.

Figure 3:
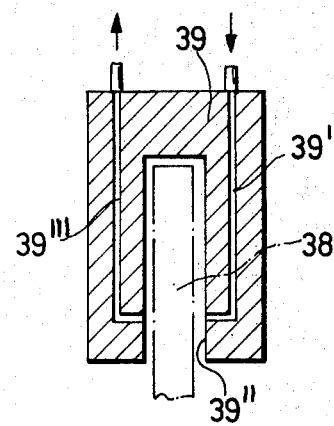
FIG. 3 is an enlarged fragmentary section taken generally on the line III—III of FIG. 1.

Secured to the stem 23 is an interrupter plate 38 which interrupts a fluid interrupter valve 39 when the stem 23 is at one limit of its reciprocatory movement, and another fluid interrupter valve 40 when the stem 23 is at its other limit of reciprocatory movement. FIG. 3 shows the interrupter valve 40 in cross section. The air current flows in the direction shown by the arrows through the intake duct 39', crosses over the groove 39'' and enters an outlet duct 39'''. If the interrupter plate 38 is moved between the opposed openings of the ducts 39' and 39''', the air current is interrupted. The outlet passages or ducts of the interrupter valves 39 and 40 are connected with the control inputs $x1$ and $x2$ respectively of a bistable valve 41.

Preferably, the quick-opening valve 3 is generally cylindrical in form, and has its interior space hermetically divided by a diaphragm 42 into a pressure chamber 43 and an exhaust chamber 44. The pressure chamber 43 communicates with one of the signal outputs 6 by means of a port 45 in the valve 3 and the conduit 46. THe pressure chamber 43 can thus be evacuated via the port 45, tube or conduit 46, signal output 6, the passage 9, passage portion 10 and ventilation holes 14. The exhaust ventilation chamber 44 is evacuated through exhaust holes 47. The exhaust chamber 44 is adapted to be connected by means of a connecting passage 48 with the exhaust duct which leads to the clean air valve, not shown. If there is high pressure in the pressure chamber 43, the membrane 42 will close off the passage 48.

The control output of port $y1$ of the bistable element 41 is connected to the ports 17 and 34, and supplies air to and evacuates air from the pressure chambers 16 and 32. A tube 49 connects the clean air container 1 with the intake ducts of the interrupter valves 39 and 40, and with the air input of the bistable valve 41. In addition, the clean air container 1 is connected with the throttle valve 26 by means of a shut-off valve 50 and a check valve 51, so that compressed air can flow from the clean air container 1 into the pressure chamber 21. Also, clean air container 1 is connected by means of a tube 52 to a connecting inlet port 53 in the housing 4 to supply the signal outputs or outlet ports 6 with compressed air.

OPERATION —EMBODIMENT OF FIGS. 1–3

The above-described mechanism operates as follows:

With fan 2 generating air pressure, and valve 50 closed, compressed air flows through the tube 49 to the interrupter valves 39 and 40 and to the bistable valve 41. Simultaneously, compressed air flows through the tube 52 to the signal outputs 6 which close the corresponding quick-opening valves 3. Since the interrupter plate 30 interrupts the interrupter valve 40, an air current from the latter reaches the control input of the bistable valve 41 which passes a signal through its output $y1$ into pressure chambers 16 and 32, so that the membrane 15 closes the opening 11 and membrane 30 closes the exhaust ventilation branch pipe 28.

When the valve 50 is opened, the compressed air flows through the check valve 51 and throttle valve 26 into the pressure chamber 21. The pressure mounting in pressure chamber 21 moves the membrane 20 with its stem 23 toward one limit of movement thereof against bias of the spring 25, whereby the pawl 36 turns the ratchet wheel 35 forward one tooth, whereupon the arm 8 is moved to the next successive signal output or outlet port 6. At the same time, the interrupter plate 38 moves away from the interrupter valve 40 and interrupts the interrupter valve 39; so that the signal lapses at the control input $x1$ of the bistable valve 41 which now receives a signal at the control input $x2$ and emits a signal at control output $y2$. Thereupon the pressure drops in pressure chambers 16 and 32. In this way, the pressure chamber 43 of the next successive quick-opening valve 3 is evacuated, whereby the pressure chamber 21 is simultaneously evacuated by means of exhaust chamber 31 and the throttle valve 33. As a result of the pressure drop in pressure chamber 21, the spring 25 moves the membrane 20 and stem 23 to its limit of movement in the opposite direction, at which time the interrupter plate 30 again closes the interrupter valve 40 and releases the interrupter valve 39, whereupon the above-described operation is repeated. The time interval between the evacuation of two consecutive quick-opening valves 23, which interval corresponds to that between two clean air blasts, is determined by the time required for the pressure chamber 21 to fill with compressed air. This time can be varied by adjusting the throttle valve 26. The throttle valve 26 thus serves to set the time interval between two successive clean air blasts. The time during which pressure chamber 43 of the quick-opening valve 3 remains evacuated and which corresponds in duration to a clean air blast, depends on the rate at which the pressure chamber 21 is evacuated. This time is adjustable by means of the throttle valve 33 which thereby controls the duration of a clean air blast. The amount of residual dust adhering to a filter tube following a clean air blast in a reverse direction therethrough, depends on the impulse force of the clean air blast. This impulses force, and hence the amount of residual dust, can be regulated by means of the metering valve 18. A small transition section from the passage portion 9 to this passage portion 10, determined by the setting of the metering valve 18, results in a reduced impulse force, and hence in an increased amount of residual dust, while a large transition section results in an increased impulse force and a reduced amount of residual dust. During a clean air blast, there is a pressure drop in the clean air chamber. The check valve 51 is provided to prevent any effect which this pressure drop might have on the chamber 21. The check valve 51 closes as soon as the pressure in the clean air chamber 1 falls below the pressure in the pressure chamber 21.

MODIFIED ARRANGEMENT OF FIGS. 4–6

Figure 4:
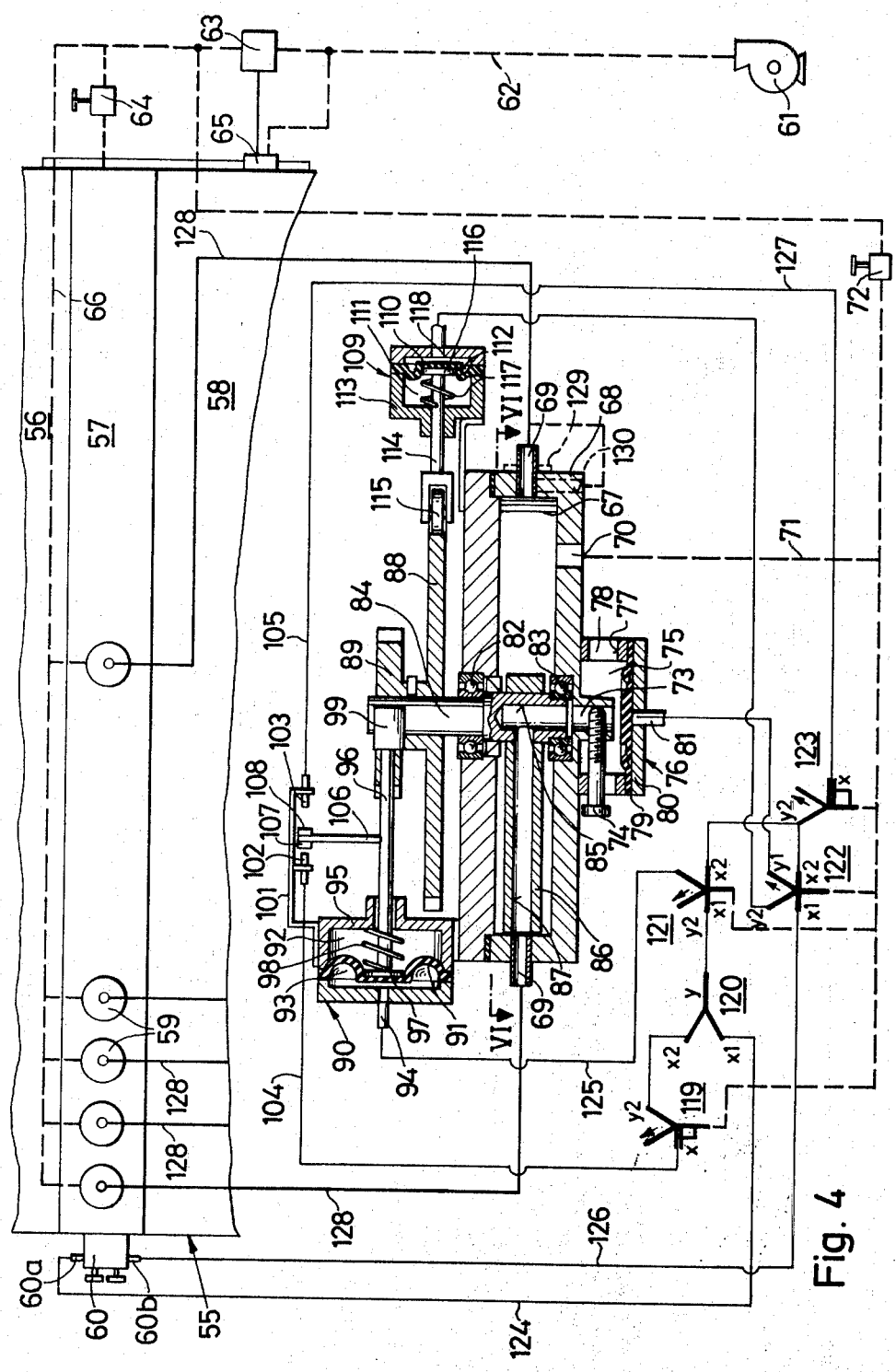
FIG. 4 is a view corresponding to FIG. 1 but showing a modified arrangement.
Figure 5:
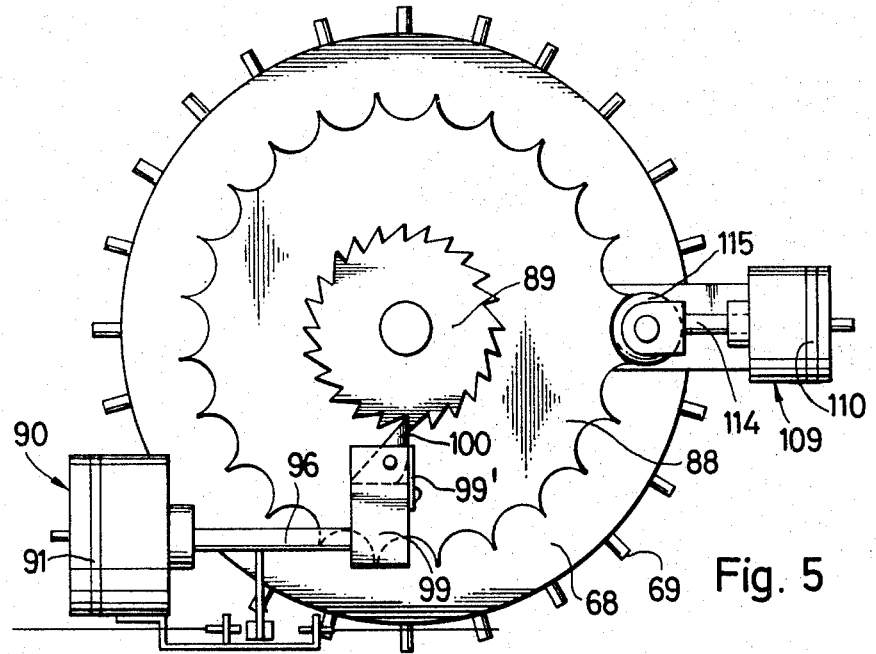
FIG. 5 is a view partly in top plan and partly diagrammatic of a portion of FIG. 4.
Figure 6:
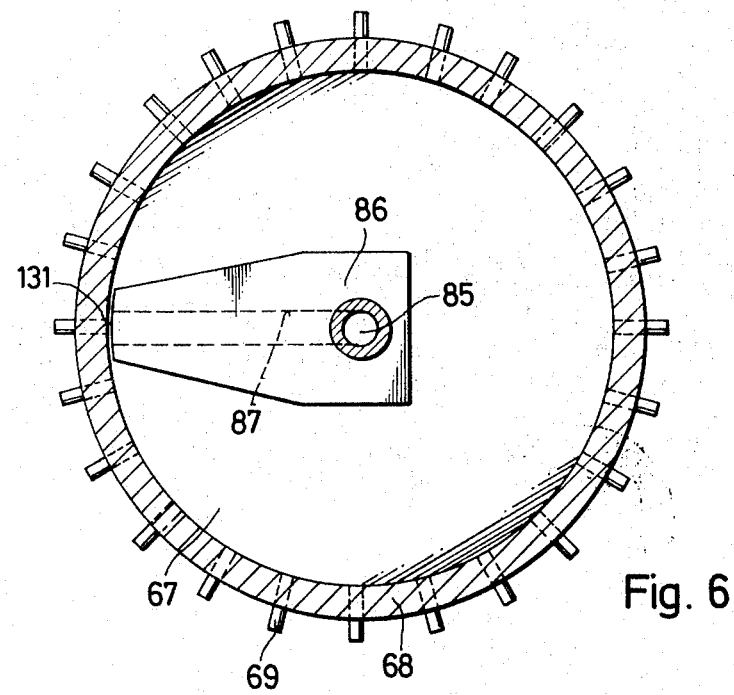
FIG. 6 is a fragmentary section taken generally on the line VI—VI of FIG. 4.

In the embodiment illustrated in FIGS. 4–6, the numeral 55 designates a pneumatic dust removal plant with a pure air chamber 56, a clean air chamber 57, and a dust air chamber 58. In the area of the clean air chamber 57, quick-opening valves 59 and a manostat 60 are mounted on the outer wall. The quick-opening valves 59 may be assumed to be identical to the quick-opening valve 3 of FIG. 1. The clean air chamber 57 is supplied from a clean air source, such as a fan 61, by a conduit or tube 62 in which a conduit valve 63 and a throttle valve 64 are mounted. The conduit valve 63 is opened and closed by a pressure differential switch 65 depending on the differential between the pressures in the clean air chamber 56 and dust air chamber 58. The clean valves, not shown, are supplied by means of a conduit 66 which is connected with the compressed air source 61.

The manostat 60 has two control outputs or ports 60a and 60b. When an upper pressure limit is reached in the clean air chamber 57, the control output 60a conveys a signal to the sequence control, while control output 60b imparts a signal to the sequence control when a lower pressure limit is reached in clean air chamber 57. The sequence control comprises a closed cylindrical chamber 67 in the walls 68 of which are disposed radial output ports or signal outputs 69 in circumferentially spaced relationship. These outputs 69 extend radially outwardly of the wall 68 and permit compressed air present in the chamber 67 to escape to the outside. In the chamber wall 68, there is also provided a connection opening 70 to which an air blast conduit 71 is connected which links the chamber 67 with the compressed air source 61 by means of a reduction valve 72. Further, the chamber wall 68 is provided with an axial exhaust opening 73 having a throttle valve screw 74, the exhaust opening 73 communicating with an exhaust chamber 75 of a housing 76, the exhaust chamber 75 communicating with the outer atmosphere through openings 77. The housing 76 is connected with the wall 68 and has a cylindrical wall 78 in which the openings 77 are arranged, and which forms the exhaust chamber 75. The exhaust chamber 75 is closed off on one side by a diaphragm or membrane 79 disposed between the cylindrical wall 78 and a cover 80. In the cover 80, a ventilation intake port 81 is provided which opens into a pressure chamber between the cover 80 and membrane 79. If forced air is introduced through The intake opening 81 into the space between the cover 80 and membrane 79, the membrane 79 presses against the mouth of the exhaust opening 73 to close off said opening. In the wall 68 are mounted bearings 82 and 83 which journal a rotatable axle 84. The axle 84 is provided with a downwardly opening axial passage 85, axially aligned with the exhaust opening 73. An arm 86 has an inner end rigidly secured to the axle 84 and extends radially outwardly therefrom, the arm 86 being provided with a radial passage 87 that communicates at its inner end with the axial passage 85 in the axle 84. The radial arm 86 and outer end of the radial passage 87 are so disposed that the passage 87 is successively moved into alignment with the several outlet ports or signal outputs 69.

A centering gear 88 and a ratchet wheel 89 are rigidly mounted on the axle 84 outwardly of the chamber 67. The number of teeth on the ratchet wheel 89 and on the centering gear 88 corresponds to the number of signal outputs or outlet ports 69. Further, the angular displacement between the teeth of the centering gear 88, the ratchet 89 and the signal outputs 69 is equal.

Firmly attached to the wall 68 is a generally cylindrical housing 90 the inside of which is divided by a membrane 91 into a spring chamber 92 and a pressure chamber 93. Mounted in the wall 95 of the housing 90 is an axially movable stem 96 having a flange 97 at one end. Between the flange 97 and the wall 95, a coil compression spring 98 is mounted which presses the stem 96 against the membrane 91. At its other end, the stem 96 is provided with a bearing 99 which supports a swivel mounted pawl 100 for operation of the ratchet wheel 89 and held in a normally operative position by a leaf spring 99'. Fastened to the housing 90 is a bracket 101 which supports the mouths 102 and 103 of two control ducts 104 and 105 respectively. Secured to the stem 96 is a laterally projecting pin 106 which carries two seals 107 and 108, the seal 107 closing the mouth 102 at one end of movement of the stem or rod 96, the seal 108 closing the mouth 102 responsive to movement of the stem 96 to its opposite limit of movement.

A housing 109 is rigidly mounted on the chamber wall 68, the interior of the housing 109 being divided into a spring chamber 111 and a pressure chamber 112 by means of a diaphragm or membrane 110. A rod or stem 114 is mounted in a wall 113 of the housing 109 for movements axially of the housing 109, the stem 114 being disposed radially of the centering gear 88. At its radially inner end, the stem 114 is provided with means journaling a wheel element 115, and at its radially outer end, the stem 114 is provided with a flange 116. A coil compression spring 117 is mounted in the spring chamber 111 and yieldingly urges the stem 114 and membrane 110 in a direction radially outwardly with respect to the centering gear 88. The housing 109 is further provided with a fluid port 118 communicating with the pressure chamber 112. Air pressure, introduced to the pressure chamber 112, moves the membrane 110 and stem 114 radially inwardly toward meshing engagement of the wheel element 115 with the centering gear 88, against bias of the spring 117. When pressure of air within the pressure chamber 112 is reduced, the spring 117 moves the wheel element 115 out of meshing engagement with the centering gear 88, as will hereinafter appear.

The control device of FIGS. 4–6 incorporates an or-nor gate or valve 119, an and-gate 120, a bistable element 121, a bistable element 122, and an or-nor gate 123. The control input $x$ of or-nor gate 119 is connected with the mouth 102 by means of the duct or tube 104. The control output $y2$ of or-nor gate 119 is connected with the control input $x2$ of and-element or gate 120. The control input $x1$ of and-element 120 is connected with the control output 60a of the manostat 60 by means of a tube 124. The output $y$ of and-element 120 is connected with the control input $x1$ of the bistable element or valve 121 the control output $y1$ of which is connected with the port 94 by means of a tube 125. The control input $x2$ of the bistable element or valve 121 is connected with the control output $y2$ of the or-nor gate 123 which is simultaneously connected with the control input $x2$ of the bistable element or valve 122. The control input $x1$ of the bistable element 122 is connected with the output 60b of the manostat 60 by means of a tube 126. The control outputs $y1$ and $y2$ of the bistable element 122 are connected with the intake opening 81 and the port 118, respectively. The control input $x$ of or-nor gate 123 is connected by means of a tube 127 with the mouth 103.

OPERATION —MODIFICATION OF FIGS. 4–6

Air entering the chamber 67 from the tube 21 flows through the signal outputs or outlet ports 69 through the tubes 128 to the quick-opening valve 59 which then closes the connected valves not shown. If the pressure differential between pure air chamber 56 and the dust air chamber exceeds a certain value, the pressure differential valve 65 will open the conduit valve 63 so that compressed air will enter the clean air chamber 57 through the throttle valve 64. If the pressure in the clean air chamber 57 reaches an upper limit, the manostat 60 generates a signal at its output $60a$ which is then conveyed to the input $x1$ of the and-gate 120. The bistable element 121 emits a signal at its output $y2$ thus supervening the signal at its output $y1$ and evacuating the pressure chamber 93. The stem 96 is moved to the left with respect to FIG. 4 by the spring 98, and the seal 107 covers the mouth 102, sealing the same. In this way, control input $x$ of or-nor gate or key 119 is closed off, whereupon the latter imparts a signal at the output $y2$ for input $x2$ of the and-element 120. The signals from the output $60a$ of the manostat 60, on the one hand, and from the or-nor gate 119 on the other, generate a signal at the output $y$ of the and-element 120, which is conveyed to the input $x1$ of the bistable valve or element 121 which then emits a signal at output $y1$ thereof and introduces forced air into the pressure chamber 93. In this way, the stem 96 is pushed to the right with respect to FIG. 4 until the seal 108 closes the mouth 103 and hence the input $x$ of the or-nor key 123 which then emits a signal at the output $y$ thereof which is conveyed to the control inputs $x2$ of the bistable elements 121 and 122. The sliding motion of the stem 96 causes the pawl 100 to advance the ratchet wheel 89 by one tooth in a counterclockwise direction with respect to FIG. 5. The bistable element 121 now evacuates the chamber 93, so that the stem 96 slides to the left with respect to FIG. 4 while the bistable element 122 introduces air to the pressure chamber 112 via the output $y2$ of the bistable element 122, and pushes the stem 114 out of the housing 109 to cause meshing engagement between the wheel element 115 and the centering gear 88. When the bistable element 122 shifts to output $y2$ thereof, the pressure chamber between the membrane 19 and cover 80 is simultaneously evacuated, so that the membrane 79 releases the mouth of the exhaust opening 73 and the corresponding quick-opening valve 59 is opened. By means of the throttle screw 74, the rate of opening of the quick-opening valve 59 can be regulated. While the stem 96 is displaced from the left to the right with respect to FIG. 4, the pressure chamber 112 receives forced air from The bistable element or valve 122 and the wheel element 115 is in mesh with the centering gear 88.

When the wheel element 115 is in mesh with the centering gear 88, the radial passage 87 in the arm 86 is axially aligned with a given signal output or outlet port 69. While the pressure chamber 112 receives forced air from the bistable element 122 from its control output $y2$, the membrane 79 is evacuated via the other control output $y1$, so that the quick-opening valve 59 corresponding to the position of the arm 86 is evacuated or opened through the passage 85, exhaust opening 73, exhaust chamber 75 and opening 77. In this way, the opened quick-opening valve 59 opens the connected valves, not shown, and there is a blast of clean air forced through the respective filter until the pressure in the clean air chamber 57 reaches a lower limit. At this point, the manostat 60 generates a signal at its output $60b$ which is conveyed to the control input $x1$ of the bistable element 122, which once again sends forced air to the membrane 79 via the control output $y1$ of the bistable element 122, and closes off the exhaust opening 73. At the same time, evacuation of the pressure chamber 112 causes disengagement of the wheel element 115 from the centering gear 88. As this happens, the stem 96 is positioned at the left-hand end of its movement with respect to FIG. 4, and the seal 107 closes the mouth 102 and the output $x$ of the or-nor key 119, so that a signal is created at the control input $x2$ of the and-gate 120. As long as the pressure differential switch 65 maintains the conduit valve 63 in an open condition, the pressure in the clean air chamber 57 will again rise to an upper limit, at which time a signal is sent by the manostat 60 to the input $x1$ of the and-element 120, after which the above-described cycle is repeated.

Figure 7:
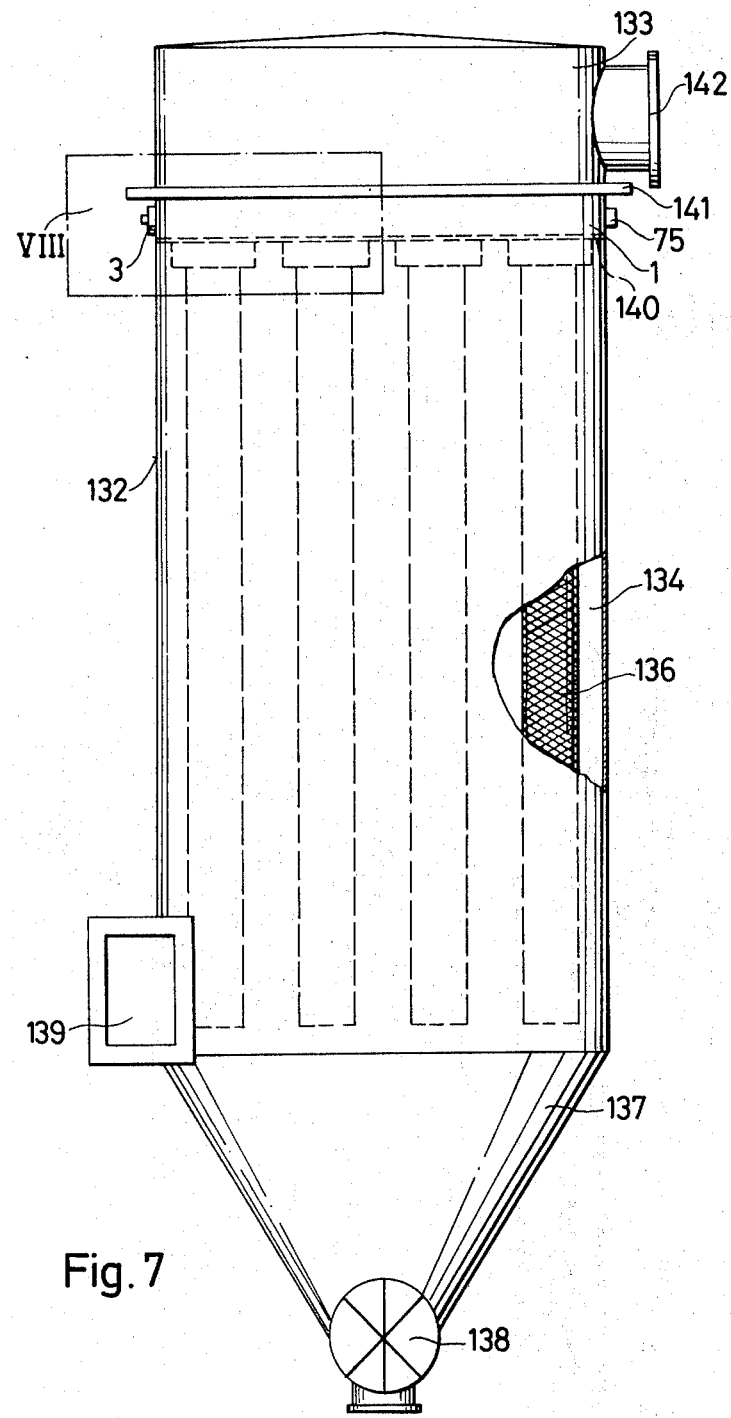
FIG. 7 is a view in side elevation of a dust removal apparatus having clean valves adapted to be operated by the control system of this invention.
Figure 8:
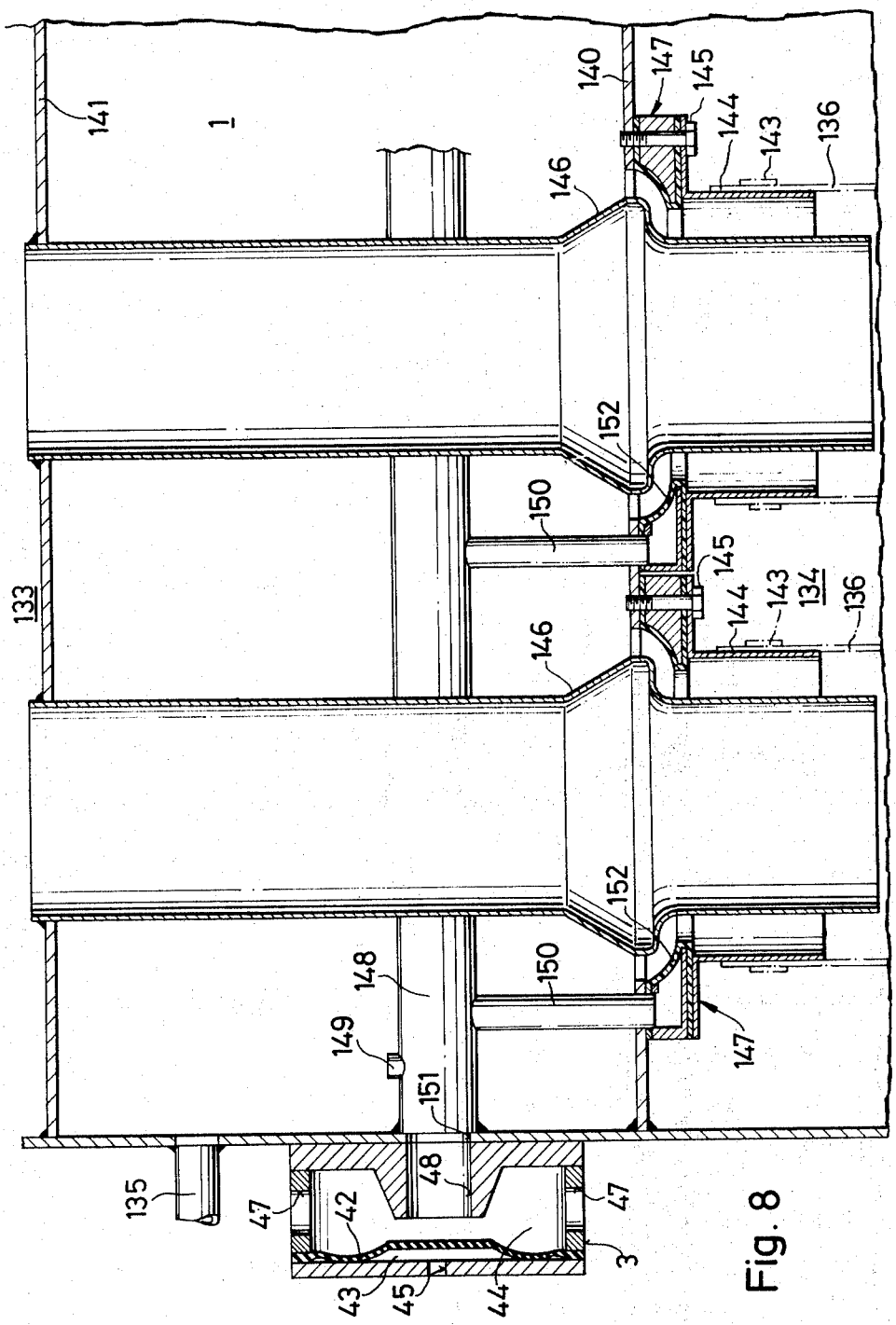
FIG. 8 is an enlarged fragmentary view in axial section of the portion of FIG. 7 bounded by the broken rectangular line VII.

FIGS. 7 and 8 show a pneumatic removal device 132 equipped with the sequence control system of FIGS. 1–3. This device 132 can be equipped in the same way with a sequence control according to FIGS. 4–6. The pneumatic dust removal device according to FIGS. 7 and 8 includes a dust-air chamber 134 in which a plurality of vertical filter hoses 136 are arranged. At the bottom of the device 132, a conical dust collection area 137 connects to the dust-air chamber 134. This collection area can be closed by a port 138. Tangentially opening into the dust-air chamber is a dust-air line 139. The dust-air chamber 134 is divided from the clean air chamber 1 by means of a separator wall 140 which, in turn, is separated from a clean air chamber 133 by a dividing wall 141. The clean air chamber has an exhaust branch pipe 142 for the clean air. A plurality of the quick-opening valves 3 are shown in FIG. 1 attached to the wall of the ventilating air chamber 1, one of the quick-opening valves 3 being shown in FIG. 7.

Each filter hose 136 is fastened by means of a clamping band 143 to a flanged tubular mounting bracket 144 which serves as a suspension means for its respective filter hose 136. Each mounting bracket 144 is secured to the dividing or separator wall 140 by means of screws 145. From the clean air chamber 133 and axial to each tubular bracket is a different one of a plurality of connecting tubes 146 each having a diametrically enlarged portion in upwardly spaced relation to a respective one of the mounting brackets 144 and forming the valve seat of a respective one of a plurality of pneumatic valves 147. Each pneumatic valve 147 is operated by a quick-opening valve 3 through a control line 148 to which several valves 147 are connected by simultaneous operation. The control line 148 is connected by means of an opening 149 with the clean air chamber 1, which is supplied with compressed air through the feeder line 135. From the control line 148, a branch line 150 leads to each valve 147. The control line 148 opens through an opening 151 into a quick-opening valve 3, as shown in FIG. 8.

The valve 147 includes an annular membrane 152. The interior of each ring membrane 152 is connected with the control line 148 by a respective one of the branch lines 150. When the membrane 42 of the quick-opening valve 3 closes off the connecting air passage 48, the annular membrane 152 is supplied with air taken from the cleaning air in the clean air container 1 through the opening 149, the control line 148, and the branch line 150. Thus, the annular or ring membrane 152 is inflated against the diametrically enlarged portion of the respective tube 146 and closes off the connecting channel between the cleaning air chamber 1 and the interior of the filter hose 136. When the membrane 42 of the quick-opening valve 3 is moved away from the passage 48, air is removed from the annular membranes 152 connected therewith, thus opening the connecting channel between the cleaning air chamber 1 and the inside of the respective filter hoses 136, and a cleaning air pulse results.

While I have shown and described a preferred embodiment of my control system, and a single modified arrangement, it will be understood that the same is capable of further modification, and that modification may be made without departure from the spirit and scope of the invention, as defined in the claims.

What is claimed is:

1. A pneumatic control system for air filter cleaning apparatus, said apparatus including a plurality of pneumatically closed quick-opening valves operatively associated with a plurality of filter elements to be cleaned, said control system comprising:
   a. a housing defining a pressure chamber having a plurality of outlet ports each adapted to be connected to a different one of said quick-opening valves, and an inlet port for connection to a source of air under pressure;
   b. a control arm in said chamber, said control arm having an outer end and an inner end portion, and an air passage extending longitudinally therethrough, said outer end being disposed to engage said housing adjacent said outlet ports;
   c. means mounting said control arm in said housing for intermittent movements of said arm in a direction whereby said air passage registers at the outer end of the arm successively with each of said outlet ports;
   d. a pneumatically operated valve communicating with said valve passage at the inner end portion of said control arm;
   e. control arm operating means for imparting said intermittent movement to said arm and including an actuator movable alternately in opposite directions;
   f. and a pneumatic circuit including said pressure source and valve means for opening said pneumatically operated valve to permit air to escape therethrough from each of said quick-opening valves in succession responsive to movements of said actuator in one direction, and to close said pneumatically operated valve responsive to movements of said actuator in an opposite direction and during movement of said arm from each outlet port to the next succeeding outlet port.

2. The control system according to claim 1 in which said inner end portion of the control arm comprises a shaft extending in a direction generally normal to said control arm and journaled in said housing, said outlet ports being disposed in circumferentially spaced relationship radially outwardly of the axis of said shaft.

3. The control system according to claim 2 in which said housing includes an end wall normal to the axis of said shaft, said outlet ports being disposed in said end wall.

4. The control system according to claim 2 in which said housing includes a cylindrical wall concentric with the axis of said shaft, said outlet ports extending radially through said cylindrical wall.

5. The control system according to claim 1 in which said actuator includes a recripocatory pawl and a fluid pressure operated device for imparting movements to said pawl in one direction, characterized by a ratchet driven by said pawl and operatively connected in said arm.

6. The control system according to claim 5, characterized by pneumatically operated centering means for releasably holding said ratchet against movement independently of said pawl and operative to release said ratchet upon movement of said pawl in one direction of said reciprocatory movement thereof.

7. The control system according to claim 5, characterized by yielding means urging said pawl in a direction of movement thereof against that which is imparted thereto by said fluid pressure operated device.

8. The control system according to claim 5 in which said fluid pressure device comprises a cylindrical housing, a diaphragm in said cylindrical housing and dividing the interior of said cylindrical housing into a spring chamber and a pressure chamber, a stem having one end connected to said diaphragm and projecting axially outwardly of said housing through said spring chamber, said pawl being mounted on said stem outwardly of said cylindrical housing, said pressure chamber being operatively connected to said pressure source.

9. The control system according to claim 8, characterized by a spring in said spring chamber yieldingly urging said diaphragm and stem in one direction of reciprocatory movement thereof, said diaphragm and stem being moved in the opposite direction against bias of said spring responsive to a predetermined rise in pressure of air in said pressure chamber.

10. The control system according to claim 9, characterized by metering valve means for controlling the rate of entry of air into said pressure chamber.

11. The control system according to claim 10, characterized by a pneumatically operated release valve operatively connected to said cylindrical housing for releasing air from said pressure chamber to atmosphere exterior of said cylindrical housing, and a metering valve operatively connected to said release valve for controlling the rate of movement of air released from said pressure chamber.

12. The control system according to claim 9, characterized by a pneumatically operated release valve operatively connected to said cylindrical housing for releasing air from said pressure chamber to atmosphere exterior of said cylindrical housing, said valve means being operatively connected to said pneumatically operated valve and said release valve and comprising bistable means in said pneumatic circuit and a pair of interrupter valves operatively associated with said actuator and responsive to said reciprocatory movements of the actuator to control operation of said bistable means.

* * * * *